(12) United States Patent
Graepel et al.

(10) Patent No.: US 11,093,702 B2
(45) Date of Patent: Aug. 17, 2021

(54) CHECKING AND/OR COMPLETION FOR DATA GRIDS

(75) Inventors: Thore Graepel, Cambridge (GB); Filip Radlinski, Cambridge (GB); Andrew Donald Gordon, Cambridge (GB); Pushmeet Kohli, Cambridge (GB); John Winn, Cambridge (GB); Lucas Bordeaux, Cambridge (GB); Yoram Bachrach, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1404 days.

(21) Appl. No.: 13/530,121

(22) Filed: Jun. 22, 2012

(65) Prior Publication Data

US 2013/0346844 A1    Dec. 26, 2013

(51) Int. Cl.
*G06F 40/18* (2020.01)
*G06F 40/216* (2020.01)
*G06F 40/226* (2020.01)
*G06F 17/18* (2006.01)

(52) U.S. Cl.
CPC .............. *G06F 40/18* (2020.01); *G06F 17/18* (2013.01); *G06F 40/216* (2020.01); *G06F 40/226* (2020.01)

(58) Field of Classification Search
CPC .................................................. G06F 17/246
USPC ....................................................... 715/200
See application file for complete search history.

(56) References Cited

U.S. PATENT DOCUMENTS

| | | | |
|---|---|---|---|
| 6,985,895 B2 | 1/2006 | Witkowski et al. |
| 7,587,685 B2 | 9/2009 | Wallace |
| 2003/0149603 A1 | 8/2003 | Ferguson et al. |
| 2004/0059518 A1 | 3/2004 | Rothschild |
| 2005/0273311 A1 | 12/2005 | Lautt et al. |
| 2008/0168341 A1 | 7/2008 | Payette |
| 2010/0169758 A1 | 7/2010 | Thomsen |

OTHER PUBLICATIONS

Barga, "Excel DataScope Overview," Mar. 1, 2011 available: http://research.microsoft.com/apps/video/default.aspx?id=147179.*
Rice, "OfficeTalk: Conditional Formatting: Adding Customized Color Scales to Excel 2007," 2007 available: http://msdn.microsoft.com/en-us/library/bb428945(v=office.11).aspx.*
(Continued)

*Primary Examiner* — Ariel Mercado
*Assistant Examiner* — Ariel Mercado Vargas (57) ABSTRACT

Checking and/or completing for data grids is described such as for grids having rows and columns of cells at least some of which contain data values such as numbers or categories. In various embodiments predictive probability distributions are obtained from an inference engine for one or more of the cells and the predictive probability distributions are used for various tasks such as to suggest values to complete blank cells, highlight cells having outlying values, identify potential errors, suggest corrections to potential errors, identify similarities between cells, identify differences between cells, cluster rows of the data grid, and other tasks. In various embodiments a graphical user interface displays a data grid and provides facilities for completing, error checking/correcting, and analyzing data in the data grid.

20 Claims, 10 Drawing Sheets

(56) References Cited

OTHER PUBLICATIONS

"Spreadsheet Column Fill", Published on: Apr. 7, 2010, Available at: http://www.vsni.co.uk/products/genstat/htmlhelp/spread/FillColumn. htm. 2 Pages.
Prior Knowledge, Inc. "Veritable API Overview" downloaded from the Internet on Apr. 26, 2012, 3 pages long.
Barga, Roger et al., Microsoft Research, "Excel DataScope", 3 pages long downloaded from the Internet on May 17, 2012.

* cited by examiner

| | A | B | C | D | E | F | G | H |
|---|---|---|---|---|---|---|---|---|
| 1 | Class | Feature 1 | Feature 2 | Feature 3 | Feature 4 | Feature 5 | Feature 6 | |
| 2 | A | 0.324074 | 0.648148 | 0.302934 | 0.648148 | 0.648148 | 0.648148 | |
| 3 | A | -0.00498 | -0.02939 | -0.01402 | -0.0218 | -0.0218 | -0.06068 | |
| 4 | B | -0.04832 | -0.09096 | -0.04904 | -0.09663 | -0.09663 | -0.09663 | |
| 5 | B | -0.00559 | -0.02083 | -0.01305 | -0.02083 | -0.02083 | -0.04614 | |
| 6 | C | 0.000459 | 0 | 0.0019 | 0 | 0 | 0 | |
| 7 | A | -0.03521 | -0.06736 | -0.02719 | -0.07041 | -0.07041 | -0.07041 | |
| 8 | C | -0.00028 | -0.0034 | 0 | -0.0034 | -0.0034 | -0.0034 | |
| 9 | A | -0.19355 | -0.40323 | -0.20302 | -0.3871 | -0.3871 | -0.3871 | |
| 10 | B | -0.00081 | -0.00353 | 0.001235 | -100 | -4.88 | -0.00488 | |
| 11 | C | 0.016763 | 0.032834 | 0.141672 | 0.033527 | 0.033527 | 0.033527 | |
| 12 | A | -0.07228 | -0.15238 | -0.05868 | -0.14455 | -0.14455 | -0.14455 | |
| 13 | B | 0.001148 | 0.009146 | 0.005145 | 0.009146 | 0.009146 | 0.006098 | |
| 14 | A | 0.013832 | 0.038416 | 0.017414 | 0.066194 | 0.066194 | 0.10461 | |
| 15 | | -0.39037 | -0.74503 | -0.3506 | -0.78074 | -0.78074 | -0.78074 | |
| 16 | | -0.19402 | -0.38803 | -0.18178 | -0.38803 | -0.38803 | -0.38803 | |

| OrdNum | Delay | CusNum | SalID | Amt | Payed | State | Payment |
|---|---|---|---|---|---|---|---|
| 100023 | 3 | 1030 | A1 | $21.80 | TRUE | WA | Card |
| 100024 | 2 | 1004 | A2 | $123.87 | FALSE | WV | Cash |
| 100025 | 5 | 1029 | B1 | $14,758.19 | TRUE (81%) | WV | Cash |
| 100026 | 1 | 1030 | B2 | $89.69 | TRUE | NY | Card |
| 100027 | 2 ± 1.2 | 1012 | C1 | $91.30 | FALSE | WV (55%) | Cash |
| 100028 | 5 | 1031 | C2 | $26.78 | FALSE (71%) | WA | Cash |
| 100029 | 1 | 1022 | A1 | $147.46 | FALSE | WA | Card |
| 100030 | 4 | 1020 | A2 | $78.54 | TRUE | NY | Cash |
| 100031 | 1 | 1037 | B1 | $139.84 | FALSE | WA | Cash |
| 100032 | 1 | 1018 | B2 | $134.21 | FALSE (62%) | WV | Cash |
| 100033 | 1 | 1016 | C1 | $21.69 | FALSE | NY | Cash |
| 100034 | 1 | 1034 | C2 | $131.29 | FALSE (89%) | MA | Card |
| 100035 | 5 | 1012 | A1 | $12.40 | FALSE | MA | Cash |
| 100036 | 2 | 1027 | A2 | $129.44 | FALSE (66%) | NY | Cash |
| 100037 | 3 | 1003 | B1 | $52.30 | FALSE | WV | Cash |
| 100038 | 1 | 1001 | B2 | $138.92 | TRUE | NY | Card |
| 100039 | 2 | 1033 | C1 | $100.17 | FALSE | MA (90%) | Card |
| 100040 | 3 ± 1.5 | 1008 | C2 | $8.90 | FALSE (68%) | WA | Cash |
| 100041 | 1 | 1034 | B1 | $101.91 | FALSE | NY | Cash |
| 100042 | 3 | 1032 | B2 | $131.82 | FALSE | WA | Cash |

CHECKING AND/OR COMPLETION FOR DATA GRIDS

BACKGROUND

Data grids having cells of data arranged in columns and rows are used in many fields such as scientific analysis of observed data, retail stock control and inventory management, personal finance, sales forecasting, enterprise budget management and planning, credit rating systems, recommendation systems and others. End users who operate data grids and manage input of data to those grids typically strive for accuracy and quality of data in the grids. This is because the accuracy and quality will influence control of downstream systems, actions or other events which occur as a result of the contents of the data grid.

However, accuracy and quality of data grids are often reduced for many reasons including human error, limitations in opportunities and time to obtain data, limitations in equipment used to observe data and others. Users may be aware of missing data in data grids. However, in many situations users may be unaware of errors and inaccuracy in data present in data grids.

The embodiments described below are not limited to implementations which solve any or all of the disadvantages of known data grid systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Checking and/or completing for data grids is described such as for grids having rows and columns of cells at least some of which contain data values such as numbers or categories. In various embodiments predictive probability distributions are obtained from an inference engine for one or more of the cells and the predictive probability distributions are used for various tasks such as to suggest values to complete blank cells, highlight cells having outlying values, identify potential errors, suggest corrections to potential errors, identify similarities between cells, identify differences between cells, cluster rows of the data grid, determine relations between columns of the data grid, and other tasks. In various embodiments a graphical user interface displays a data grid and provides facilities for completing, error checking/correcting, and analyzing data in the data grid.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
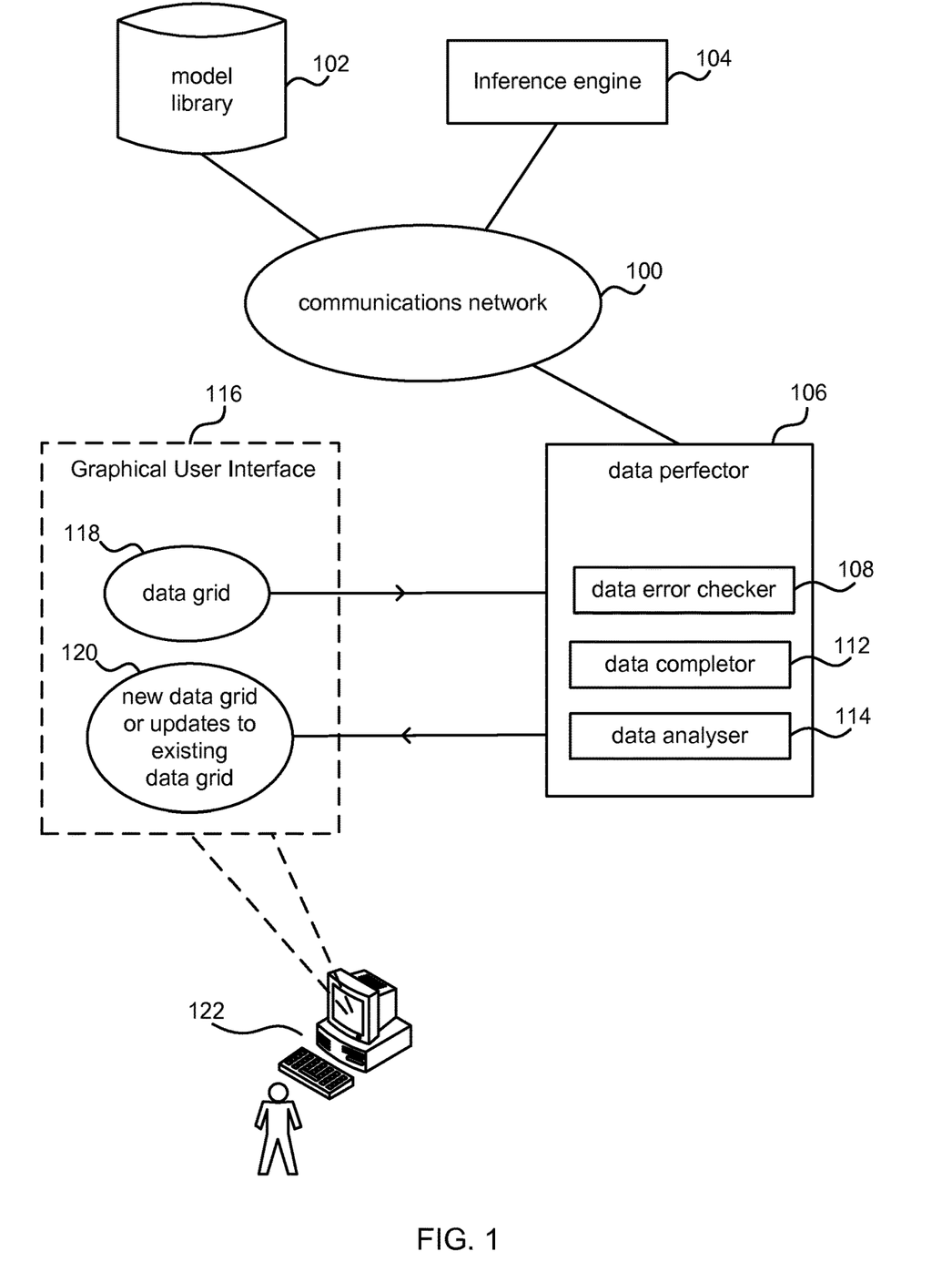
FIG. 1 is a schematic diagram of a data perfector for use with data grids.

FIG. 1 is a schematic diagram of a computer-implemented data perfector 106 for use with data grids 118 which have cells of data arranged in columns and rows. The data values in the cells may be numerical or categorical or free text (strings) and some of the cells may be empty. An empty cell may be referred to as a cell having an unobserved data value or having a null data value. In the examples described herein the data in one or more rows represent independent events, objects or entities. The data in the columns represent attributes and have a uniform type across rows; that is, values within a column have the same type with the exception of missing values which may be marked empty, null or by some string such as "???". A non-exhaustive list of examples of types of data value is: float, Boolean, categorical, integer, percentage, string, date, time.

The data perfector 106 receives a data grid 118 and may return either a new data grid 120 with errors corrected and blank cells completed, or potential updates to the data grid comprising suggested error corrections, suggested blank cell completions and other information. An end user device 122 such as a personal computer, smart phone, tablet computer or any other computing device is able to display the data grid 118 and to communicate with the data perfector 106. A graphical user interface 116 and data grid functionality which enables an end user to manipulate the data grid(s) 118, 120 as well as to create, store, edit, delete and use data grids is provided either at the end user device 122 or by the data perfector 106 or in any other way. The data perfector 106 may be integral with the end user device or may be at another entity in communication with the end user device. The data perfector 106 comprises various components including a data error checker 108 arranged to find random errors in the data grid 118 and optionally to suggest corrections to those errors, 108a data completer 112 arranged to suggest values for blank cells in the data grid (and optionally to add more rows of data to the data grid and/or more columns of data to the data grid), and a data analyzer 114 arranged to highlight similarities and/or differences in the data as explained in more detail below. For example, the data error checker 108 may identify outliers that may have been caused by data entry mistakes or by errors in sensing equipment observing the data. The data error checker 108 may identify errors in categories that have been wrongly assigned to a row for example, or errors in data expressed as percentages which do not sum to 100.

The data perfector 106 either incorporates an inference engine 104 or is in communication with an inference engine 104 as illustrated in FIG. 1. The inference engine is arranged to use machine learning and/or statistical analysis to infer a predictive probability distribution for each of the values in the data grid, both the unobserved values (blank cells) and the observed values (cells containing data values). The inference engine may construct a probabilistic model of the data grid using a variety of possible types of model available in a model library 102 accessible to the inference engine 104.

The end user works with the data grid 118 at his or her end user device 122 and is able to make use of the power of probabilistic inference even if he or she has no training in statistics or machine learning. Existing data grids may be used without the need to export data from the existing data grids and manipulate that data before carrying out machine learning and inference. Also, the end user does not need to pre-process the data from the data grid, for example, to transform variables of different types or remove examples with missing data. This simplifies operation for the end user. The end user may trigger the operation of the data perfector by selecting a range of cells in the data grid, or in some examples, without the need for any user input (for example, the data perfector may work in a fully automatic fashion). For example, the data perfector may automatically update, or indicate that updates are available, for one or more values in the data grid whenever a user edits the data grid. Once a data grid has been updated using the data perfector 106 an end user may make an input at the graphical user interface 116 to re-run processing by the data perfector 106.

In some examples data is accessible to the inference engine from one or more entities in the cloud such as entities connected via a communications network to the inference engine. In this way, large amounts of data may be available to the inference engine where those amounts may be larger than an amount of data which may practically and/or usefully be displayed at an end user device in a graphical user interface showing a data grid. By using large amounts of data at the inference engine the accuracy and certainty of predictions made by the inference engine may be increased. The data accessed by the inference engine from the cloud may be incomplete, inaccurate and/or noisy in the same way as described above for the data grid 118.

In some examples the data grid 118 may comprise part of the data accessed by the inference engine from the cloud. The inference engine may use the data available to it from the cloud (which may be much more than the data in the data grid) to infer a predictive probability distribution for each value in the data grid. This improves the quality of the results as compared with using only data from the data grid. For example, the data perfector may receive the data grid and an indication that the data grid is a part of a larger set of data accessible to the inference engine.

Figure 2:
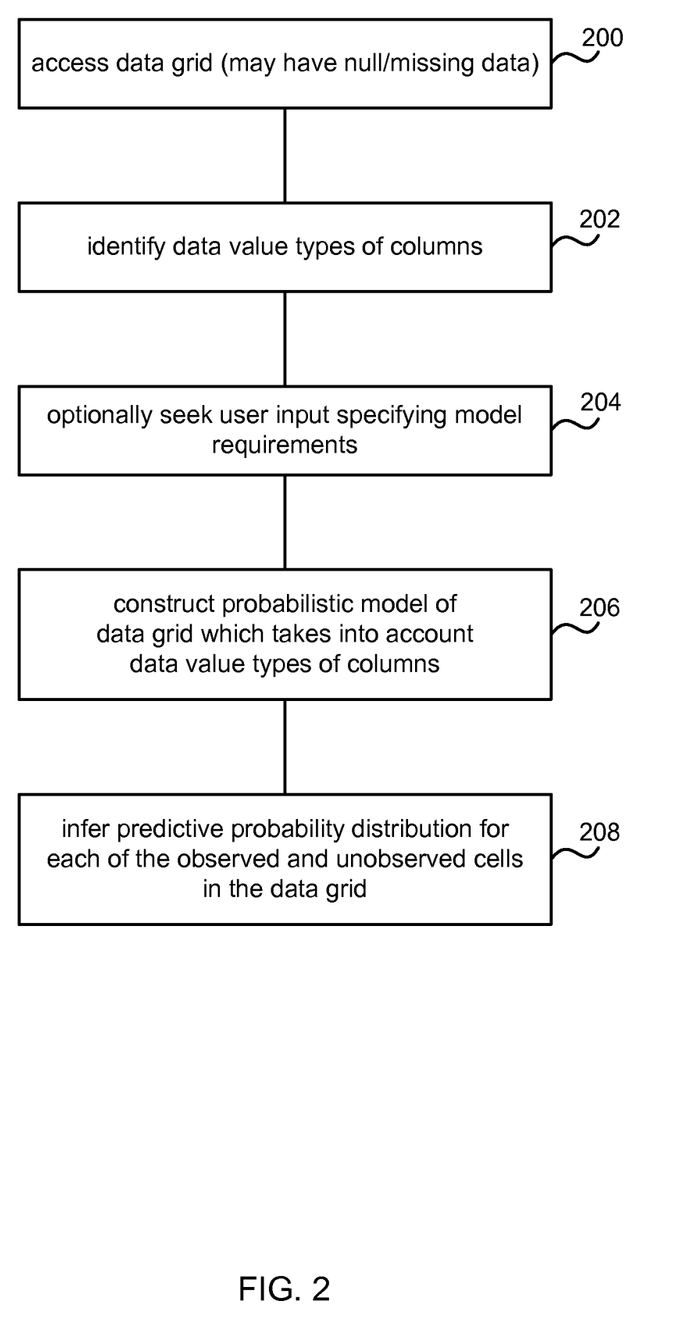
FIG. 2 is a flow diagram of a method at an inference engine for use in conjunction with the data perfector of FIG. 1.

FIG. 2 is a flow diagram of an example method at the inference engine 104 of FIG. 1. The inference engine accesses 200 a data grid which may have one or more null or missing cell values. The inference engine identifies the data value types of the columns of the data grid that it receives. In some examples the inference engine is provided with the data value types of the columns by the data perfector. In some examples the inference engine determines the data value types of the columns of the data grid by inspecting the data grid. For example, a column may contain the symbols "0", "1", "2", "3", which may be interpreted as categories represented by numerals or which may be interpreted as numbers. The inference engine may infer the true underlying type by applying machine learning/statistical modeling. In some examples the process of identifying the data value types of the columns of the data grid may be carried out by another entity in advance of operation of the inference engine and data perfector.

The inference engine optionally receives 204 user input specifying model requirements. For example, a user may specify which type of probabilistic model (as mentioned above) to be used from the model library 102. A user may also specify any prior information that he or she has about data values in the data grid. In an example, a user may exclude one or more columns from inference by selecting columns at a graphical user interface. In another example a user may specify constraints between column values such as to specify that the values listed in specified columns are percentages and should sum to 100. In another example, a user may specify possible dependencies between specified columns. In an example, a user may select application-domain specific models such as models suitable for financial data, medical data, environmental data and others.

In some examples the data perfector is arranged to automatically work out prior information about data values in the data grid (such as where there are percentage values which need to sum to 100) using rules or other criteria.

The inference engine constructs 206 a probabilistic model of the data grid which takes into account the data value types of the columns. When enough data is available from the data grid, the inference engine uses the model to infer 208 a predictive probability distribution for each of the observed and unobserved cells in the data grid. The data perfector 106 is then able to use the predictive probability distributions in order to carry out error checking, data completion and other tasks in relation to the data grid. More detail about how the inference engine constructs the model and carries out inference is given later in this document. This process may occur in the background whilst an end user is operating a data grid at a graphical user interface.

In some examples, the inference engine constructs a probabilistic model of the data grid as described above, and the model is trained using a first set of rows of the data grid. The trained model is then used to infer values for use by the data perfector in respect of a second set of rows of the data grid, different from the first set.

Figure 3:
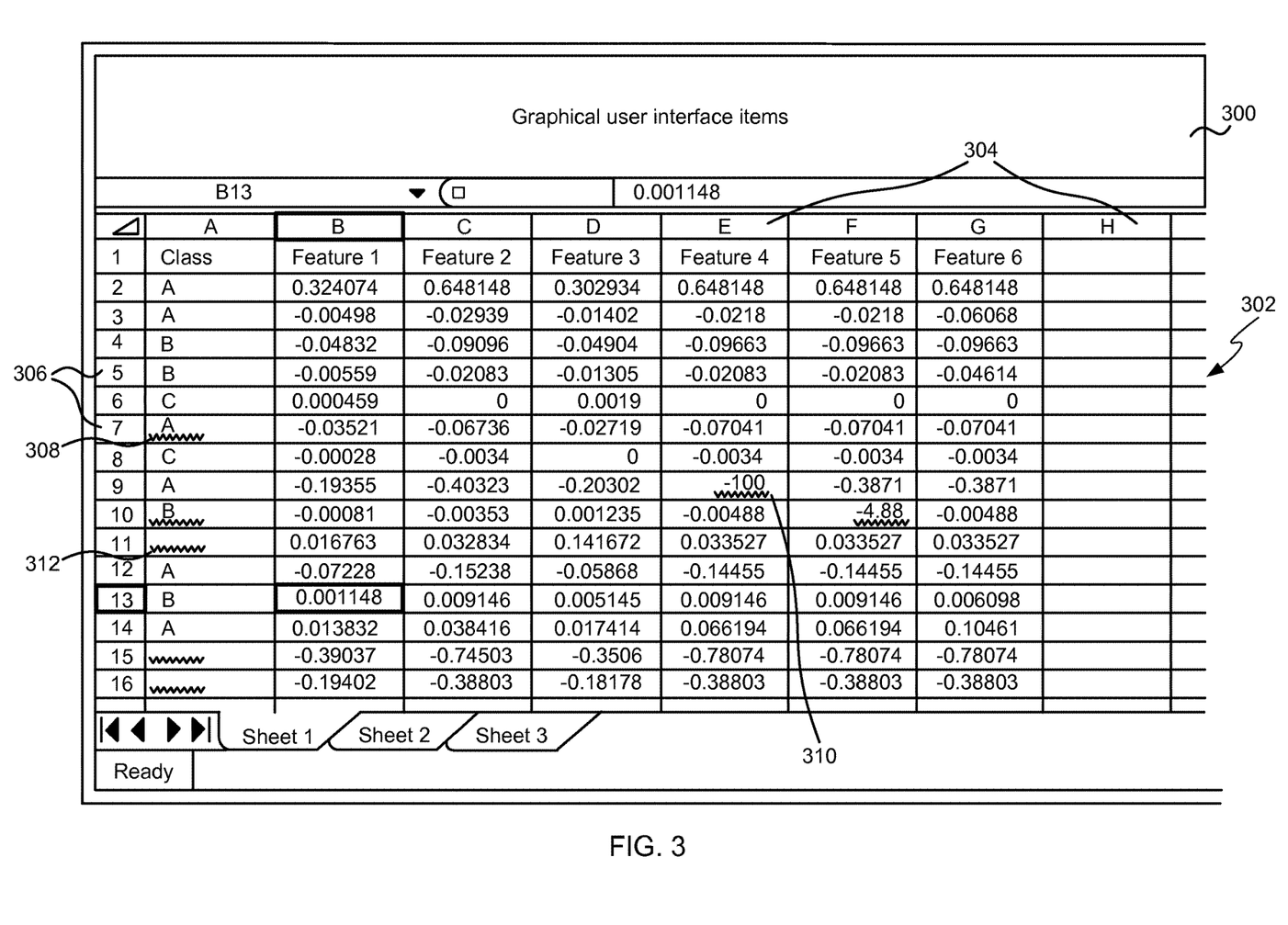
FIG. 3 is a schematic diagram of a graphical user interface displaying a data grid and results from a data perfector.

FIG. 3 is a schematic diagram of a graphical user interface displaying a data grid 302 comprising cells arranged in rows and columns and indicating the availability of results from a data perfector. A panel 300 of graphical user interface items is displayed to enable a user to create, edit, delete and manipulate data grids. The data grid 302 has a plurality of columns 304 labeled A through H in this example. The data grid 302 has a plurality of rows 306 labeled 1 through 16 in this example. Some of the cells are blank such as cell A,11 cell A,15 and cell A,16. In this example, the fact that results from a data perfector are available for some of the cells is indicated by wavy lines in those cells. For example, cell A,7 (308 in FIG. 3); cell E,9 (310 in FIG. 3); cell A,10; cell F,10; cell A,11 (312 in FIG. 3); cell A,15 and cell A,16. The wavy lines are an example only. Any suitable graphical indicator may be used such as a triangle in a corner of a cell, an exclamation mark in a triangle shape adjacent to a cell or any other graphical indicator. In order to view the results from the data perfector a user is able to right click on the appropriate cell and cause a pop up display to appear at the graphical user interface as now described with reference to FIGS. 4 to 6. A "right click" is an example of a user input method for opening a contextual menu (in this case the pop up display is a contextual menu). Any other user input method for opening a contextual menu may be used.

Figure 4:
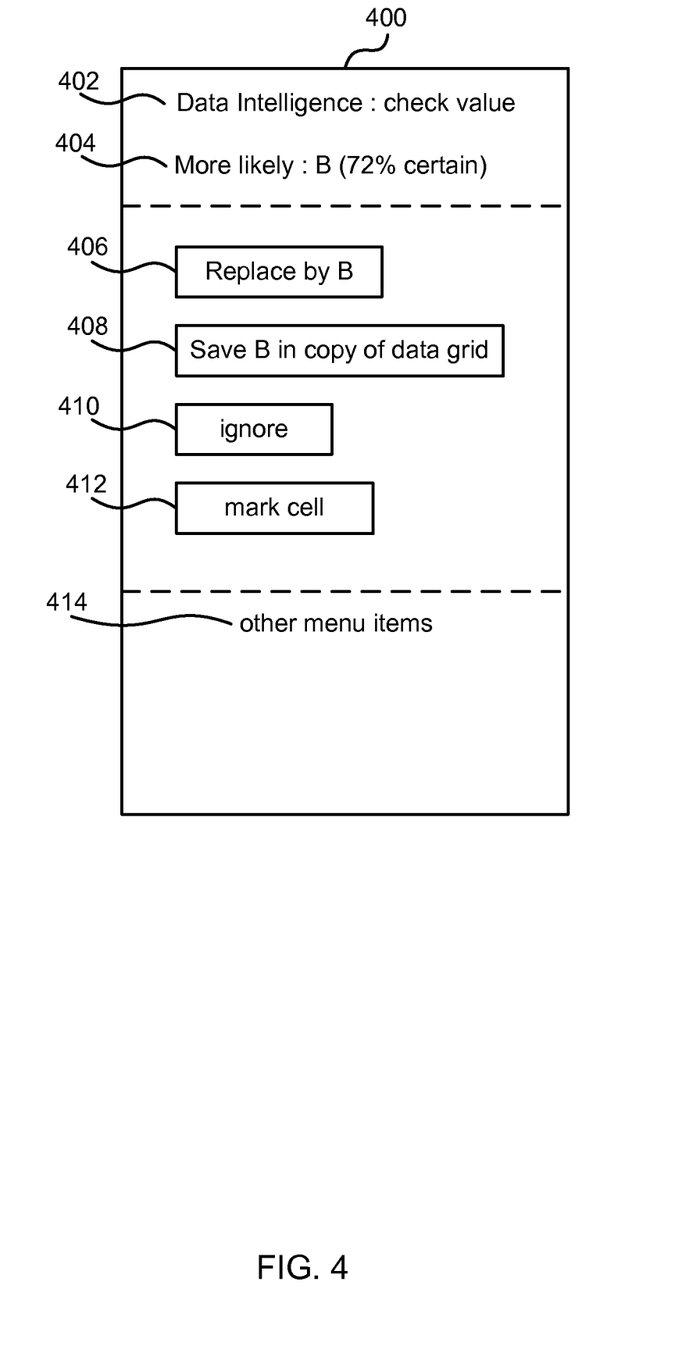
FIG. 4 is a schematic diagram of a pop-up menu of a graphical user interface for displaying an error detected by a data perfector.

If a user selects the underlined A of FIG. 3 (indicated by 308 in FIG. 3), for example, by making a right click with a mouse at that cell location, then a pop up display may appear as illustrated schematically in FIG. 4. The pop up display comprises a panel 400 which displays results 402, 404 from the data perfector 106 and also displays a plurality of menu items 406 to 414 which comprise actions to be carried out by the functionality which provides the data grid in the event that a user selects one of the menu items. In this example, the results 402, 404 from the data perfector comprise warning text suggesting that the value of the cell be checked and suggestion text suggesting that the value of the cell is more likely to be the category B where that suggestion is 72% likely to be correct. This is an example of an output of the data error checker 108 of FIG. 1. The data error checker 108 may receive or access a predictive probability distribution for cell 308 and use that predictive probability distribution to identify that the value A for the cell is likely to be incorrect and also to suggest a correct value for the cell. More detail about how this may be achieved is given below with reference to FIG. 8.

If a user selects the menu item 406 then the functionality which provides the data grid may replace the current value of the cell by B. In this case, the data grid is modified. If a user selects the menu item 408 then the functionality which provides the data grid may make a copy of the data grid and replace the value of the current value of the cell by B in that copy. If the user selects the menu item 410 then the functionality which provides the data grid may suppress any annotation of the current cell. If the user selects the menu item 412 then the functionality which provides the data grid may mark the current cell, for example, by shading, by putting a colored triangle in the corner of the cell or in any other way. Other menu items 414 may also be present to enable a user to manipulate the cell in other ways.

Figure 5:
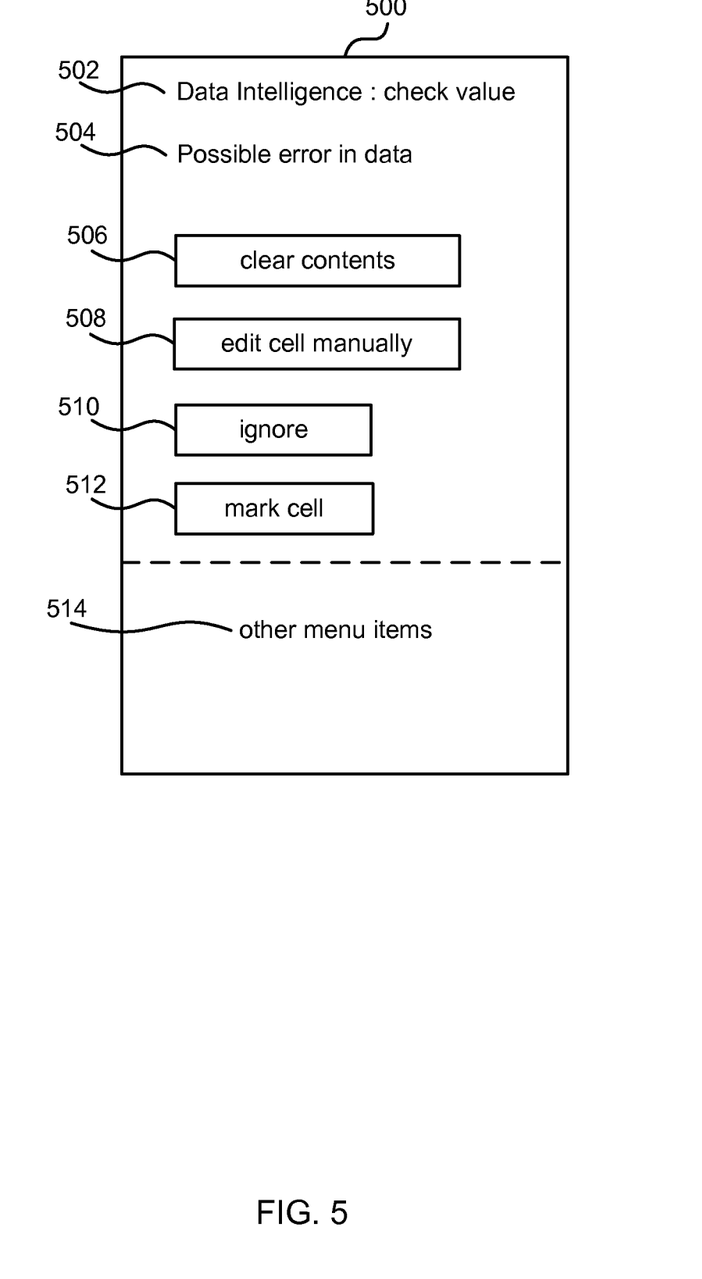
FIG. 5 is a schematic diagram of a pop-up menu of a graphical user interface for displaying another error detected by a data perfector.

If a user selects the underlined −100 of FIG. 3 (indicated by 310 in FIG. 3), for example, by making a right click with a mouse at that cell location, then a pop up display may appear as illustrated schematically in FIG. 5. The pop up display comprises a panel 500 which displays results 502, 504 from the data perfector 106 and also displays a plurality of menu items 506 to 516 which comprise actions to be carried out by the functionality which provides the data grid. In this example, the results from the data perfector comprise warning text suggesting that the value of the cell be checked and reason text explaining that the value of the cell is likely to be wrong. This is an example of an output of the data error checker 108 of FIG. 1. The data error checker 108 may receive or access a predictive probability distribution for cell 310 and use that predictive probability distribution to identify that the value −100 for the cell is likely to be incorrect. More detail about how this may be achieved is given below with reference to FIG. 8.

If a user selects the menu item 506 then the functionality which provides the data grid may clear the current value of the cell. In this case, the data grid is modified. If a user selects the menu item 508 then the functionality which provides the data grid may move a cursor to the current cell to enable a user to manually edit the cell value. If the user selects the menu item 510 then the functionality which provides the data grid may take no action. If the user selects the menu item 512 then the functionality which provides the data grid may mark the current cell as described above. Other menu items 514 may also be present to enable a user to manipulate the cell in other ways.

Figure 6:
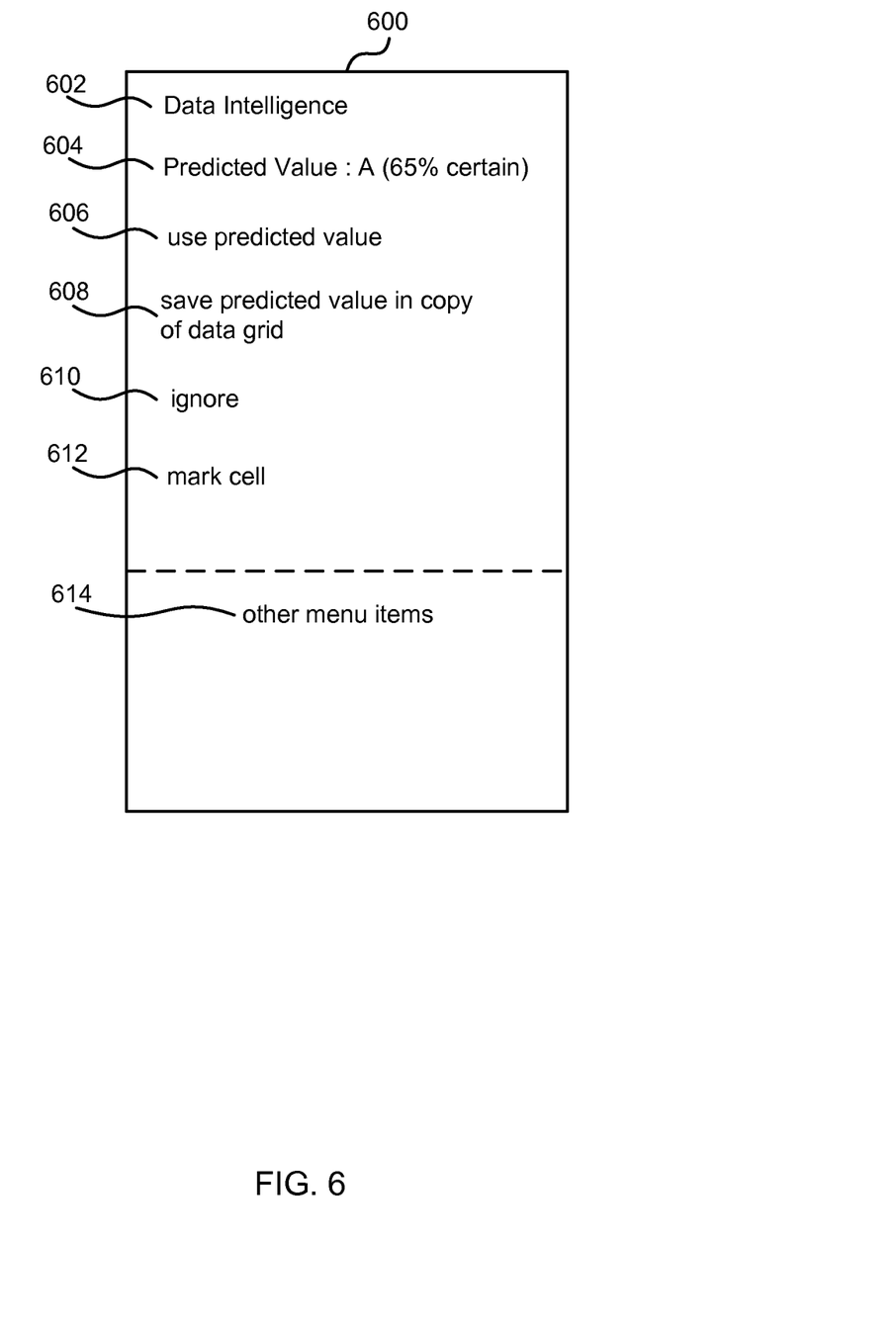
FIG. 6 is a schematic diagram of a pop-up menu of a graphical user interface for displaying results generated by a data perfector.

If a user selects a blank cell with a wavy line in it (indicated by 312 in FIG. 3), for example, by making a right click with a mouse at that cell location, then a pop up display may appear as illustrated schematically in FIG. 6. The pop up display comprises a panel 600 which displays results 602, 604 from the data perfector 106 and also displays a plurality of menu items 606 to 614 which comprise actions to be carried out by the functionality which provides the data grid. In this example, the results from the data perfector comprise warning text indicating that there are data intelligence results from the data perfector, and suggestion text suggesting that the value of the cell is category A with a 65% chance that the suggestion is correct. This is an example of an output of the data completer 112 of FIG. 1. The data completer 112 may receive or access a predictive probability distribution for cell 312 and use that predictive probability distribution to suggest that the value A for the cell is likely to be correct with a specified certainty. More detail about how this may be achieved is given below with reference to FIG. 8.

If a user selects the menu item 606 then the functionality which provides the data grid may replace the current value of the cell by the predicted value. In this case, the data grid is modified. If a user selects the menu item 608 then the functionality which provides the data grid may make a copy of the data grid and replace the value of the current value of the cell by the predicted value in that copy. If the user selects the menu item 610 then the functionality which provides the data grid may take no action. If the user selects the menu item 612 then the functionality which provides the data grid may mark the current cell, for example, by shading, by putting a colored triangle in the corner of the cell or in any other way. Other menu items 614 may also be present to enable a user to manipulate the cell in other ways.

Figure 7:
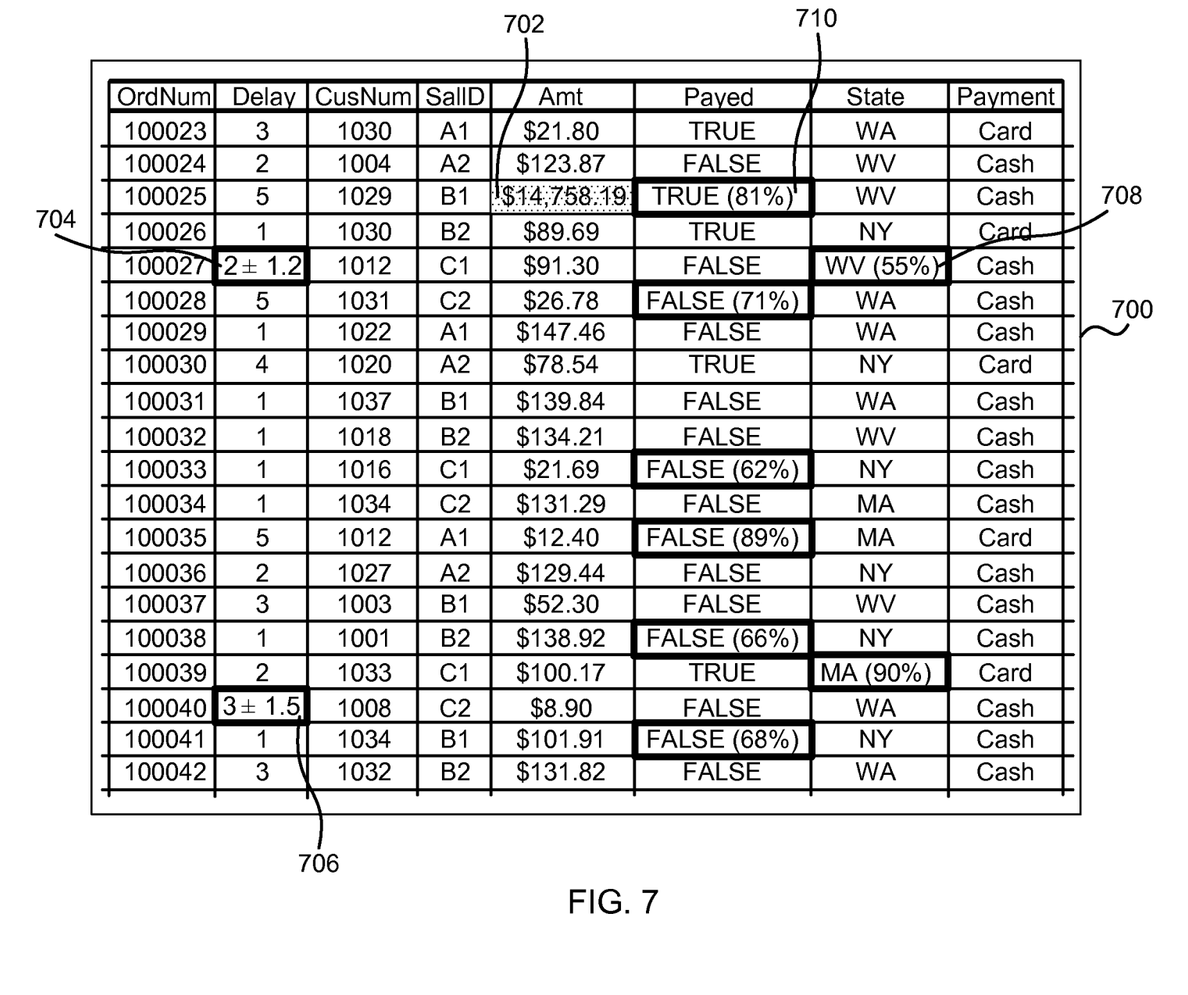
FIG. 7 is a schematic diagram of another example graphical user interface displaying a data grid and results from a data perfector.

FIG. 7 is a schematic diagram of a graphical user interface displaying a data grid 700 and results from a data perfector. In this example, each row comprises feature values for a customer order. A data error checker 108 of a data perfector may identify one or more outliers where an outlier is a value which is extreme with respect to a predictive probability distribution associated with a cell. In the example of FIG. 7 cell 702 is marked to indicate that its value has been identified as an outlier. A data completer 112 may suggest values to be added to empty cells. For example, cells 704 and 706 contain suggested values and an indication of the certainty of those suggested values. This is also the case for cells with a Boolean or categorical value and a percentage such as cells 708 and 710.

Figure 8:
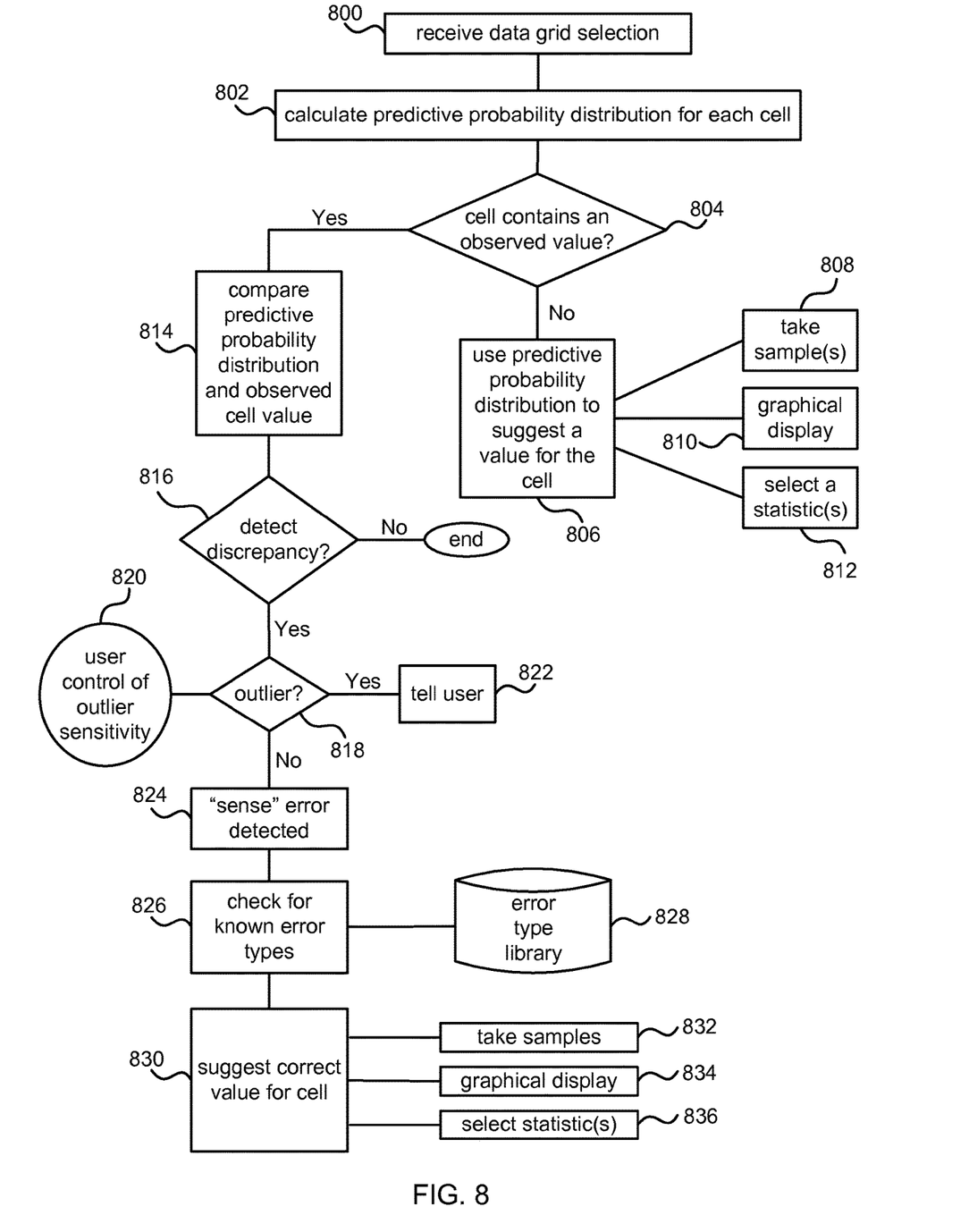
FIG. 8 is a flow diagram of a method at least partially carried out at a data perfector.

FIG. 8 is a flow diagram of a method carried out at least in part at a data perfector. A data grid selection is received 800 or accessed by an inference engine as described above with reference to FIG. 2. The inference engine generates a probabilistic model and carries out inference to calculate 802 a predictive probability distribution for each cell of the data grid selection.

The data perfector checks 804 whether a first cell in the data grid selection contains an observed value. If not, the data completor 112 uses 806 the predictive probability distribution for that cell to suggest a value for that cell. In an example, this is achieved by taking 808 one or more samples from the predictive probability distribution. Each sample may be used as a suggested value. It is also possible to aggregate a plurality of sampled values to give a suggested value. In some examples, the top-k most probable values may be used. Where the data completor 112 is used to suggest values for two or more blank cells of the data grid selection then, by taking samples, correlations between suggested values may be apparent to an end user.

The data completor 112 may create a graphical display 810 of the predictive probability distribution such as a histogram, plot line, or other graphical representation and provide that for display at the graphical user interface. For example, the graphical display 810 may be within the blank cell concerned or may be a pop up display associated with the blank cell.

The data completor 112 may select one or more statistics describing the predictive probability distribution, such as mean, median, mode, variance or other statistics. The data completor 112 may compute the values of the selected statistics or may request those from the inference engine. The statistics may be summary statistics such as expectation or variance. The values of the selected statistics may be displayed at the graphical user interface.

If the first cell in the data grid does contain an observed value then the data perfector may compare 814 the predictive probability distribution for the cell with the observed value in the cell. If no discrepancy is detected (for example, according to specified thresholds or other criteria) then no action is taken. Otherwise the data error checker assesses 818 whether the observed cell value is an outlier. This may be achieved by using thresholds or criteria set by a user 820 or which are pre-configured. If an outlier is detected the data error checker may present 822 information at a graphical user interface to inform the user.

If no outlier is detected the data error checker 108 may assess whether an error is present 824 for example, by checking 826 for known error types using an error type library 828. Examples of error types may be use of incorrect units, use of percentage data which do not sum to 100, violation of a sign constraint where numbers should be non-negative, but a negative number is observed, violation of an all-different constraint, where values in cells need to be different but are the same. The data error checker 108 may suggest 830 a correct value for the cell by using the predictive probability distribution of the cell. For example, by taking one or more samples 833 from the predictive probability distribution, by making a graphical display 834 of the predictive probability distribution, by selecting 836 one or more statistics describing the predictive probability distribution. Combinations of two or more of these methods may be used.

Figure 9:
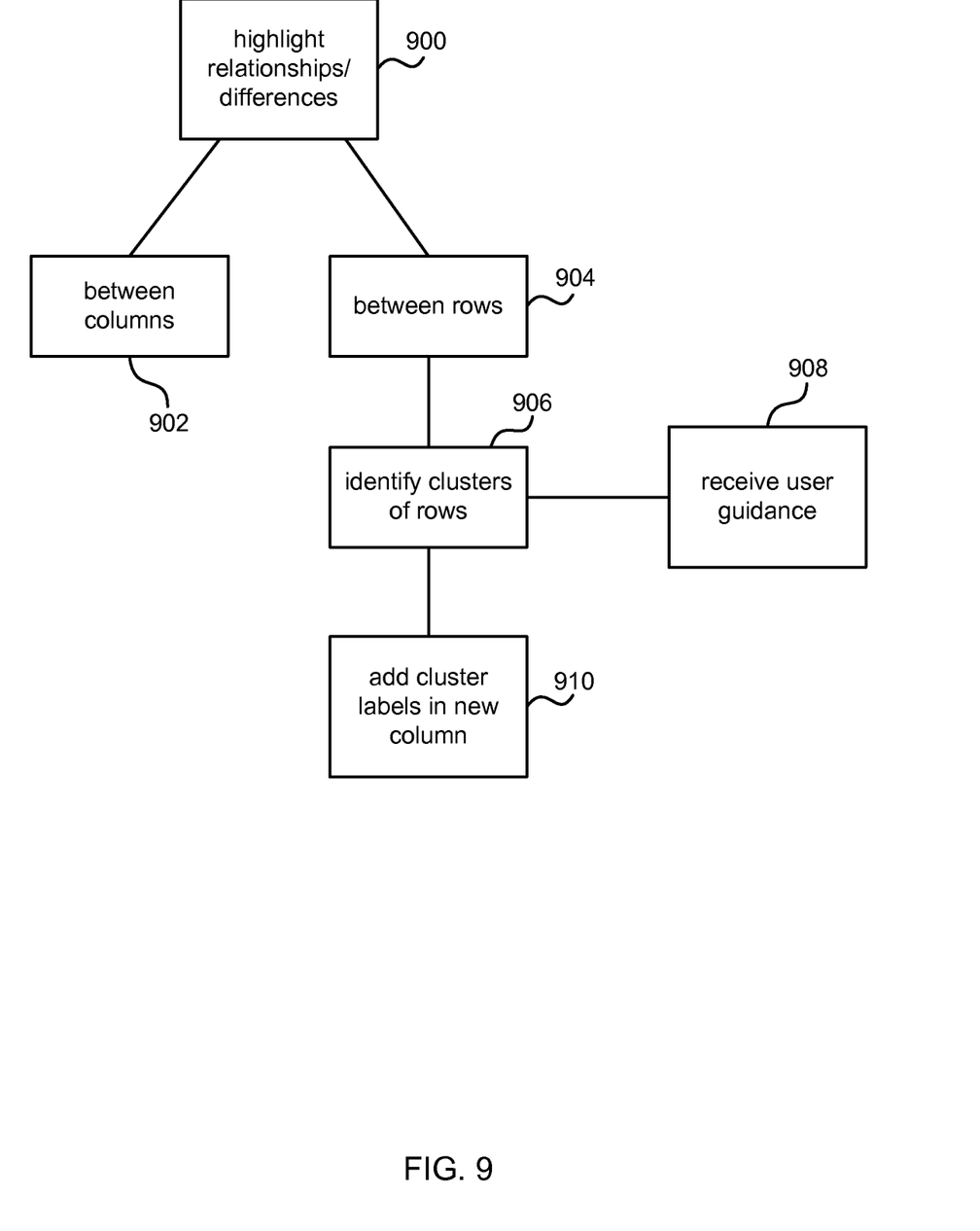
FIG. 9 is a flow diagram of a method at a data analyser component of a data perfector.

FIG. 9 is a flow diagram of a method at a data analyser 114 component of a data perfector. The data analyser 114 may use the predictive probability distributions from the inference engine to highlight 900 relationships and/or differences in a data grid. For example, between columns 902, or between rows 904 of a data grid where similarities or differences in the predictive probability distributions are identified. Differences in the predictive probability distributions may be based on inferred model parameters such as association probabilities with mixture components or other latent variables. The similarities and/or differences may be displayed in the data grid at the graphical user interface using shading, colors or in any other way. In an example, a user may select a cell containing an inferred value (a value added to a cell by the data perfector) and the data perfector may highlight those cells that influence the inferred value the most. In another example, a user may select a cell containing an observed value and the data perfector may highlight those cells containing inferred values which it influences the most.

In an example, the data analyser may identify 902 clusters of rows and create 910 a new column of cluster labels. In some examples user guidance may be received 908 such as where a user marks (in a new column) rows that he or she thinks are interesting and the data perfector then fills in the blank cells in that new column so as to label all the rows as interesting or not according to the same criteria as the human user.

As mentioned above the inference engine is arranged to generate a probabilistic model of a data grid which takes into account the data value types of the columns of the data grid. The inference engine may access a library of probabilistic models. More detail about the inference engine is now given.

The inference engine is arranged to jointly model the cell values of a data grid that has heterogeneous column types and the rows assumed exchangeable. The inference engine creates a probabilistic model of a particular data grid it receives using any of a variety of possible types of model which may be available from a model library 102 or other sources.

Examples of types of model that may be used include but are not limited to: joint Gaussian generalized linear models, joint Gaussian generalized linear models with reduced dimensionality, heterogeneous mixture models, cross-cat mixture models. The models may contain elements to make them robust to errors and outliers.

A joint Gaussian generalized linear model is based on a set of latent variables that are modeled using a multivariate Gaussian. For example, the columns of the data grid are modeled as random variables with a joint distribution $p(x_1, \ldots, x_n)$ and the rows are modeled as independent and identically distributed samples from the joint distribution $p(x_1, \ldots, x_n)$. The model structure may be inferred from the data types of the columns of the data grid. Existing values (from filled cells of the grid) may be used as input data to train the model and missing values (cells that are empty) may be inferred by querying the trained model. Observed values are derived from the latent variables based on different link functions such as the identity function for unbounded real numbers, the logistic function for Boolean values, the softmax function for categorical values, the Poisson for count values, and a link function from a Beta regression for percentages. A combined Gaussian/Wishart prior may be used on the latent Gaussian variables.

A joint Gaussian generalized linear model with reduced dimensionality is similar to a joint Gaussian generalized linear model but with the number of jointly Gaussian latent variables reduced to a smaller number. The full set of latent variables is obtained through a linear transformation. A combined independent Gaussian/Gamma prior is used for the parameters describing the linear transformation.

A Heterogeneous mixture model assumes that the data is generated as a mixture of component distributions and assigns a latent component assignment variable to each row of the table. The component distributions may be independent for each column and the distributions used depend on the type of the columns such as Gaussian for unbounded real, Bernoulli for Boolean, discrete for categorical, Poisson for integer, Beta for percentages, Gamma for non-negative real, von Mises-Fisher for geo-location in latitude/longitude format.

A cross-cat mixture model partitions the columns of the table into groups. For each group it assumes that the rows are generated from a mixture but restricted to the columns in the group.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 10:
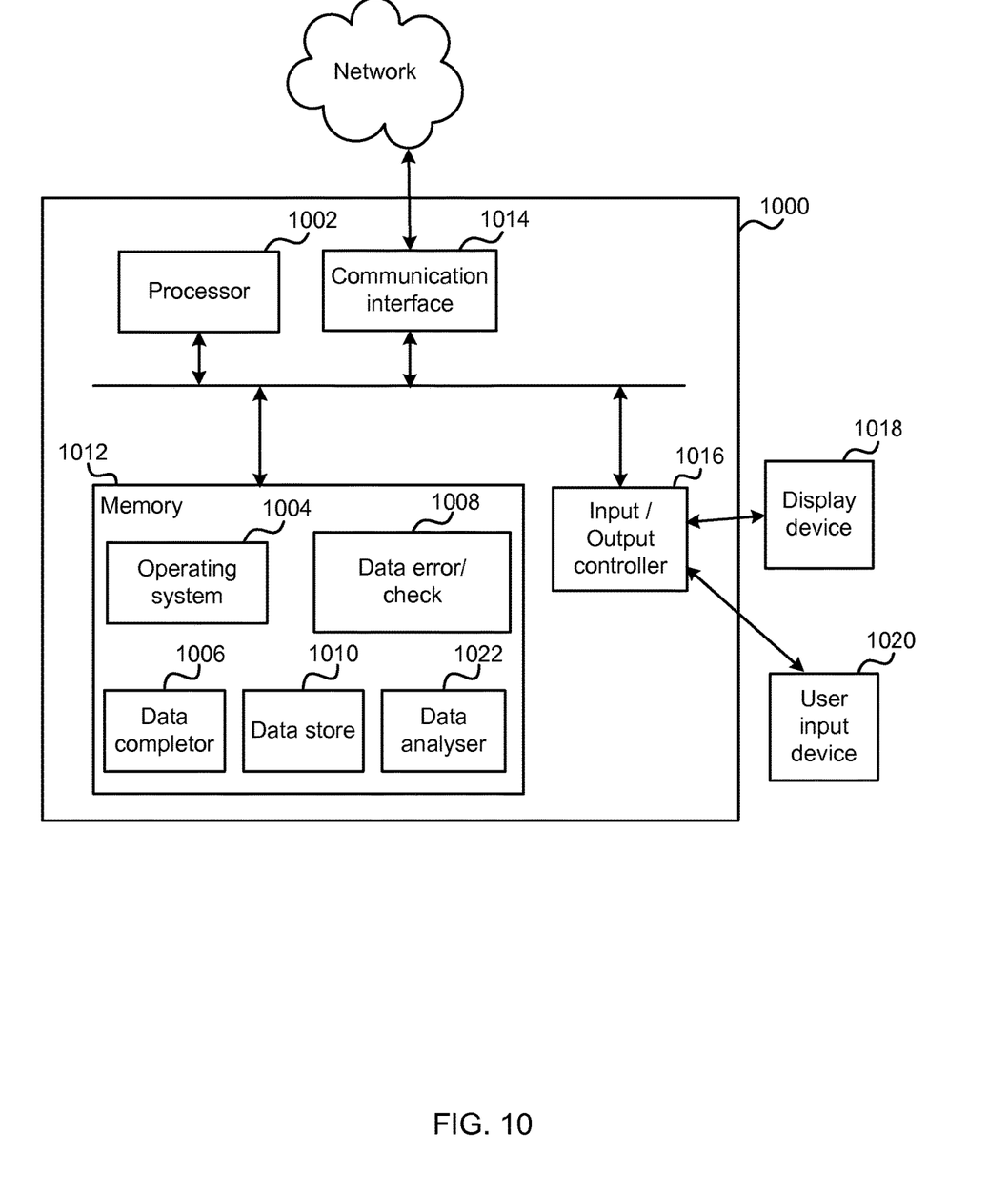
FIG. 10 illustrates an exemplary computing-based device in which embodiments of a data perfector for data grids may be implemented.

FIG. 10 illustrates various components of an exemplary computing-based device 1000 which may be implemented as any form of a computing and/or electronic device, and in which embodiments of a data perfector for data grids may be implemented.

Computing-based device 1000 comprises one or more processors 1002 which may be microprocessors, controllers or any other suitable type of processors for processing computer executable instructions to control the operation of the device in order to perfect data of a data grid such as by completing missing values of a data grid; identifying outlier values in a data grid; identifying errors in a data grid and suggesting corrected values; highlighting differences and similarities between data in a data grid. In some examples, for example where a system on a chip architecture is used, the processors 1002 may include one or more fixed function blocks (also referred to as accelerators) which implement a part of the methods described herein in hardware (rather than software or firmware). Platform software comprising an operating system 1004 or any other suitable platform software may be provided at the computing-based device to enable a data completer 1006, a data error checker 1008, and a data analyser 1022 to be executed on the device. An inference engine and model library may be accessed via communication interface 1014 or may be provided at the device 1000.

The computer executable instructions may be provided using any computer-readable media that is accessible by computing based device 1000. Computer-readable media may include, for example, computer storage media such as memory 1012 and communications media. Computer storage media, such as memory 1012, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 1012) is shown within the computing-based device 1000 it will be appreciated that the storage may be distributed or located remotely and accessed via a network or other communication link (e.g. using communication interface 1014).

The computing-based device 1000 also comprises an input/output controller 1016 arranged to output display information to a display device 1018 which may be separate from or integral to the computing-based device 1000. The display information may provide a graphical user interface. The input/output controller 1016 is also arranged to receive and process input from one or more devices, such as a user input device 1020 (e.g. a mouse, keyboard, camera, microphone or other sensor). In some examples the user input device 1020 may detect voice input, user gestures or other user actions and may provide a natural user interface (NUI). This user input may be used to create, edit, delete, manipulate data grids, set sensitivity levels for outlier detection, and for other methods as described herein. In an embodiment the display device 1018 may also act as the user input device 1020 if it is a touch sensitive display device. The input/output controller 1016 may also output data to devices other than the display device, e.g. a locally connected printing device.

The input/output controller 1016, display device 1018 and optionally the user input device 1020 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, rgb camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc.

and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   presenting, using a processor, a data grid at a graphical user interface, the data grid comprising cells arranged in rows and columns, at least some of the cells containing data values;
   determining, by applying a predictive probability distribution, that a data value contained in at least one cell of the data grid is an outlier with respect to the predictive probability distribution;
   using the predictive probability distribution, providing a suggested data value for the outlier data value, the suggested data value being a suggested data value for correcting the outlier data value in the at least one cell which is likely to be an error, or a suggested data value for a cell in the data grid which contains no data value; and
   presenting, at the graphical user interface, the suggested data value having an associated numerical probability value indicative of a correctness of the suggested data value, wherein the associated numerical probability value indicates a likelihood that the suggested data value correctly corresponds to (i) a data value that should be in the at least one cell instead of the data value in the cell or (ii) a data value missing from the cell that contains no data value, the associated numerical probability automatically determined based in part on the applied predictive probability distribution, and the associated numerical probability value being a percentage value indicating the likelihood that the suggested data value is a correct value that should have been the data value in the at least one cell.

2. A method as claimed in claim 1 comprising receiving user input associated with the suggested data value and, as a result of the user input, either ignoring the suggested data value, or modifying the data grid using the suggested data value, or creating a copy of the data grid containing the suggested data value.

3. A method as claimed in claim 1, wherein the at least one cell that contains the outlier data value is visually highlighted.

4. A method as claimed in claim 1 comprising, when the at least one cell contains no data value, autocompleting the cell by inserting the suggested data value into the cell at the graphical user interface.

5. A method as claimed in claim 1 wherein a data analyzer identifies clusters of rows and creates a new column of cluster labels, and wherein the predictive probability distribution is trained using a first set of the rows to infer values for a second set of the rows.

6. A method as claimed in claim 1 comprising presenting, at the at least one cell in the graphical user interface, certainty information associated with the suggested data value.

7. A method as claimed in claim 1 comprising, when the at least one cell contains no data value, using the predictive probability distribution to obtain the suggested data value by obtaining an expected value based on the predictive probability distribution.

8. A method as claimed in claim 1 comprising, when the at least one cell contains a data value, checking for a discrepancy between the data value of the at least one cell and the predictive probability distribution, and when a discrepancy is found, marking the at least one cell at the graphical user interface in order that a user is able to visually identify a cell with a potential data error or the outlier data value, wherein the potential data error comprises an error type being at least one of incorrect units, use of percentage data which do not sum to 100, a violation of a sign constraint where numbers should be non-negative, but a negative number is observed, or a violation of an all-different constraint, where values in cells need to be different, but are the same.

9. A method as claimed in claim 8 comprising receiving user input specifying predictive probability distribution model requirements and setting a sensitivity and using the sensitivity to find the outlier data value.

10. A method as claimed in claim 1 comprising, when the at least one cell contains a data value, checking for a discrepancy between the data value of the at least one cell and the predictive probability distribution, and when a discrepancy is found using the predictive probability distribution to suggest a correction to the data value of the at least one cell.

11. A method as claimed in claim 10 comprising using the predictive probability distribution to suggest the correction to the data value of the at least one cell and to give a certainty of the suggested correction.

12. A method as claimed in claim 1 comprising, for each of a plurality of the cells, obtaining from an inference engine the predictive probability distribution of a value associated with the cell, using the predictive probability distributions to identify differences or relationships between cells and presenting the identified differences or relationships at the graphical user interface.

13. A method as claimed in claim 1, wherein the suggested data value is a categorical value indicating one of a plurality of clusters to which rows of the data grid belong.

14. A method as claimed in claim 1 comprising obtaining the predictive probability distribution from an inference engine which comprises a probabilistic model of the data grid, the model taking into account data value types of the data grid, the data grid having heterogeneous types between at least some of the columns and uniform data value types within columns.

15. A method comprising:
presenting, using a processor, a data grid at a graphical user interface, the data grid comprising cells arranged in rows and columns, at least some of the cells containing data values;
for at least one of the cells, obtaining a predictive probability distribution of a value associated with the cell from an inference engine comprising a probabilistic model of the data grid, the model taking into account data value types of the data grid, the data grid having heterogeneous types between at least some of the columns and uniform data value types within columns;
determining, by applying the predictive probability distribution, that a data value contained in at least one cell of the data grid is an outlier with respect to the predictive probability distribution;
using the predictive probability distribution, providing a suggested data value for the outlier data value, the suggested data value being a suggested data value for correcting the outlier data value in the at least one cell which is likely to be an error;
presenting, at the graphical user interface, either the suggested data value having an associated numerical probability value indicative of a correctness of the suggested data value, wherein the associated numerical probability value indicates a likelihood that the suggested data value correctly corresponds to (i) a data value that should be in the at least one cell instead of the data value in the cell or (ii) a data value missing from the at least one cell, the associated numerical probability automatically determined based in part on the applied predictive probability distribution, and the associated numerical probability value being a percentage value indicating the likelihood that the suggested data value is a correct value that should have been the data value in the at least one cell; and
either selecting the suggested data value and entering the suggested data value into the associated cell or discarding the suggested data value.

16. A method as claimed in claim 15 comprising highlighting, at the graphical user interface, the at least one cell that contains the outlier value.

17. An apparatus comprising:
a graphical user interface arranged to present a data grid comprising cells arranged in rows and columns, at least some of the cells containing data values;
an input arranged, for at least one of the cells, to obtain from an inference engine a predictive probability distribution of a value associated with the cell;
a data perfector, the data perfector being hardware, arranged to use the predictive probability distribution to obtain at least one output value selected from: a data value in the data grid which is an outlier with respect to the predictive probability distribution, a data value in the data grid which is likely to be an error, a suggested data value, the suggested data value being any of: a suggested data value for correcting a data value in the data grid which is likely to be an error, a suggested data value for a cell in the data grid which contains no data value; and
the graphical user interface being arranged to present either the at least one output value including highlighting the at least one cell containing the suggested data value having an associated numerical probability value indicative of a correctness of the suggested data value, the highlighting comprising any of: shading the at least one cell or placing a colored triangle in a corner of the at least one cell, wherein the associated numerical probability value indicates a likelihood that the suggested data value correctly corresponds to (i) a data value that should be in the cell instead of the data value in the cell or (ii) a data value missing from the cell, the associated numerical probability automatically determined based in part on the predictive probability distribution, and the associated numerical probability value being a percentage value indicating the likelihood that the suggested data value is a correct value that should have been the data value in the at least one cell; and
the input further arranged to receive, from a user, a selection of one of the at least one output value and to enter the selected output value into the associated cell.

18. An apparatus as claimed in claim 17 the data perfector being arranged to, when the at least one cell contains no data value, autocomplete the cell by inserting the at least one output value into the cell at the graphical user interface.

19. An apparatus as claimed in claim 17 the data perfector being arranged to, when the at least one cell contains a data value, check for a discrepancy between the data value of the at least one cell and the predictive probability distribution, and when a discrepancy is found, mark the at least one cell at the graphical user interface in order that a user is able to visually identify a cell with a potential data error or an outlier data value.

20. An apparatus as claimed in claim 17 the data perfector being at least partially implemented using hardware logic selected from any one or more of: a field-programmable gate array, a program-specific integrated circuit, a program-specific standard product, a system-on-a-chip, a complex programmable logic device.

* * * * *